United States Patent

[11] 3,584,606

| [72] | Inventor | Guy M. Reidhead |
| | | 406 South 1st Street, Phoenix, Ariz. 85004 |
| [21] | Appl. No. | 811,938 |
| [22] | Filed | Apr. 1, 1969 |
| [45] | Patented | June 15, 1971 |

[54] LARIAT WITH RELEASABLE HONDA
4 Claims, 3 Drawing Figs.

[52] U.S. Cl............................................... 119/153,
24/128
[51] Int. Cl......................................................... A01k 29/00
[50] Field of Search........................................... 119/153,
29; 24/128, 123.1, 123.4, 115.6, 201TR, 201S, 230SL

[56] References Cited
UNITED STATES PATENTS

| 444,717 | 1/1891 | Stout | 24/230.5 X |
| 1,397,126 | 11/1921 | Keenum | 24/115.6 UX |
| 1,800,756 | 4/1931 | Sass | 24/115.6 UX |
| 2,414,945 | 1/1947 | Grund | 119/153 X |
| 2,607,097 | 8/1952 | Lingner | 24/260 X |

Primary Examiner—Hugh R. Chamblee
Attorney—Drummond, Cahill and Phillips

ABSTRACT: A lariat formed by a rope looped back upon itself and threaded through a honda secured to the end of the rope. The honda is split to permit it to release a rope passing therethrough upon the application of a predetermined force thereon.

PATENTED JUN 15 1971

3,584,606

INVENTOR.
GUY M. REIDHEAD
BY
Drummond, Cahill & Phillips
ATTORNEYS

LARIAT WITH RELEASABLE HONDA

The present invention pertains to lariats, and more particularly, to lariats that may conveniently be utilized for practicing the art of roping.

The present state of the art of roping dictates that for professional proficiency and even to a great extent the proficiency of amateurs a significant number of hours must be spent in practicing. Conventionally, such practice is obtained by throwing the lariat at a solid object, such as a fence post or a wooden horse, to gain facility with throwing the lariat and gauging distances as well as control. The practice must be continued from a stationary to a moving object so that the ultimate purpose of the learning achieves fruition in the ability of the roper to capture his quarry.

This sustained period of practice, which usually requires years to gain proficiency, is generally accomplished by the unproductive and disagreeable task of having to walk from the positioned occupied by the roper at the time of the throw to the object being roped (e.g., fence post, wooden horse, etc.) to untangle the loop from the object after a successful throw. The time required to walk to the object of the throw or target consumes a substantial proportion of the total time spent during practice. This time required for retrieving the lariat or disentangle it from the target is completely unproductive and does not enhance the ability of the roper. In practice on moving targets, the general procedure is to utilize a trained roping horse and to rope or "capture" calves or steers of the same general characteristics as will be encountered either on a working ranch or in a contest such as occur in rodeos. The difficulty in such practice is that the calves or steers soon learn that after they are released from the "chute" into the arena they will be chased and roped, and as soon as a rope settles upon them, they will be jerked or snapped to a standstill when the rope becomes taut. The animals used for practice, having learned the results of being roped and having learned that pulling on the rope is futile, soon refuse to leave the chute in the customary manner and refuse to run in a straight line. Such animals immediately upon feeling the rope settling upon them, learn to stop rather than to continue and be jerked by the rope. Thus, animals used for practice must continuously be changed in order to present meaningful practice to the roper. If the roper is to obtain proficiency sufficient for meaningful competition, the number of calves or steers that he must practice upon becomes prohibitive and certainly beyond the means of most individuals seriously interested in roping. Another serious disadvantage in practicing roping from horseback is that a successful throw results in a captured animal, requiring the roper to dismount and disentangle the target from his lariat. It will be obvious that a substantial proportion of the total time expended in the practice of roping moving targets, such as calves or steers can and will be expended in dismounting, disentangling and remounting rather than the fundamental and critical considerations of throwing the lariat.

It is therefore an object of the present invention to provide a lariat combination intended for practicing roping.

It is another object of the present invention to provide a lariat intended for practice, the use of which does not require the roper to disentangle his rope from the stationary object being roped.

It is still another object of the present invention to provide a lariat wherein moving objects such as calves and steers may be roped without the animal acquiring undesirable traits that render it unsuitable for further roping practice.

It is still a further object of the present invention to provide a lariat intended for roping practice wherein animals may be roped without the animal experiencing the unpleasant feeling of being "jerked" at the end of the rope and without the requirement of the roper dismounting.

These and other objects of the present invention will become apparent to those skilled in the art as the description proceeds.

Briefly, in accordance with the embodiment chosen for illustration, the present invention contemplates the utilization of a lariat formed by a rope looped back upon itself and passing through a honda attached to the end of the rope. Usually, a small loop is formed at the end of a rope to which the rope is folded back upon itself and passes through to form the big loop of the lariat. This smaller loop has been called by various names, but characteristically is known as a "honda." For purposes of defining terms in the present application, the term "honda" means the small loop formed at the end of a rope through which the other end of the rope may be passed to form a lariat. Whereas the prior art forms the honda of rope, the present invention utilizes a separate apparatus formed by a rigid material such as an aluminum casting or rigid plastic material that is split into separable halves. The two halves are biased into contact with each other so that when in contact they provide the function of conventional honda. However, the biasing means is resilient so that when sufficient pressure is applied on the honda by the rope passing therethrough, the two halves separate, thereby releasing whatever target is entangled in the lariat.

The present invention may more readily be described by reference to the accompanying drawings, in which.

Figures 2, 3:
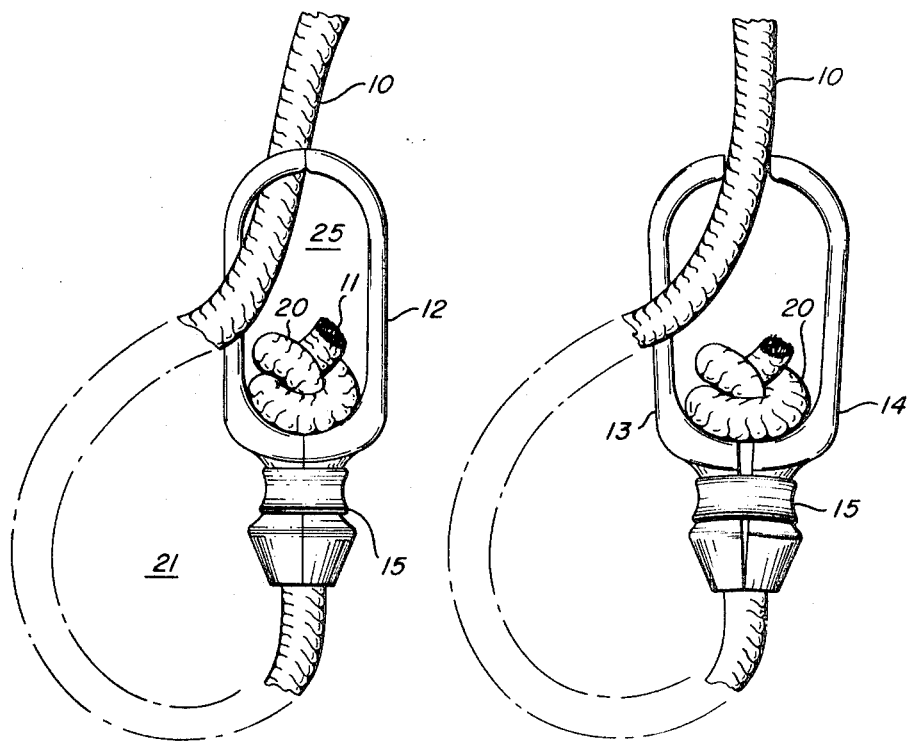
FIG. 2 is an elevational view of a lariat constructed in accordance with the teachings of the present invention, showing the rigid honda with the rope of the lariat passed therethrough.
FIG. 3 is an illustration of the apparatus of FIG. 2, illustrating the rope being withdrawn from the honda.
Figure 1:
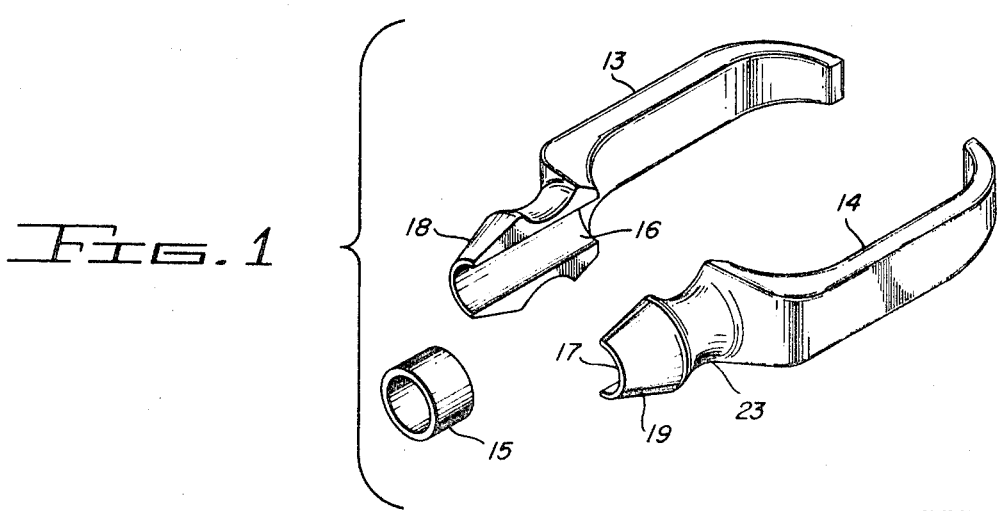
FIG. 1 is an exploded view of a honda for use in a lariat constructed in accordance with the teachings of the present invention.

Referring now to the drawings, a conventional rope 10 is shown which may be formed of the usual lariat materials, such as hemp, nylon, or the like. Characteristically, such rope is relatively stiff so that when it is formed into a loop and "thrown," the stiffness of the rope tends to maintain the loop in a circular pattern rather than an elongated, narrow pattern which could occur if the rope were extremely flexible. The end of the rope 11 is attached to a honda 12. As mentioned previously, the prior art hondas are generally formed from the rope 10 by constructing a loop in the end thereof; professional ropers, either on a working ranch or in competition, will generally line the honda with leather or in some instances with metal to prevent fraying of the rope and facilitate the slippage of the rope through the honda. The honda 12 of the present invention may be formed of any rigid material, such as cast aluminum or a rigid plastic and is secured to the end of the rope 11 in any convenient manner. In the embodiment chosen for illustration, the honda 12 is longitudinally divided into two halves 13 and 14 which are pivotally urged into contact with each other by an elastic biasing means 15 which may be formed of a rubber grommet. It will be obvious that the two halves 13 and 14 could be pivoted by pinning the two halves together, but it has been found that the construction shown is less expensive, lighter, and more convenient to use. The halves 13 and 14 are each provided with a channel 16 and 17 respectively which, when the halves are joined together, form a passageway to receive the rope 10 extending therethrough. In the embodiment chosen for illustration, the rope is passed through the passageway formed by the channels 16 and 17 and is knotted such as shown at 20 to prevent the end 11 from withdrawing from the honda 12. The method of attachment of the rope may be by a knot such as shown in the embodiment chosen for illustration, or may be a variety of other means such as forming an enlarged diameter section of the rope by melting (when a nylon or similar material rope is used).

The rope 10 passes through the honda 12 to form the loop 21 of the lariat. When an object is captured within the loop 21, the rope 10 exerts pressure on the two halves 13 and 14 of the honda 12, thus attempting to part the halves. When the force exerted on the rope is sufficient to overcome the counteracting force of the biasing means 15, the halves 13 and 14 open as shown in FIG. 3 to permit the rope to be "slipped" or "snapped" out of the honda. It will be apparent that when the rope 10 leaves the honda, the loop 21 no longer exists and the target previously captured within the loop 21 is automatically released.

In the embodiment chosen for illustration, the honda 12 is formed of cast aluminum and provides an elongated loop 25. It has been found that this configuration lends itself to the ready passage of the rope 10 therethrough while maintaining the bulk weight and width of the honda to a minimum. The overall weight of the honda thus configured is substantially the same as the prior art hondas formed integrally with the end of the rope.

The halves 13 and 14 of the honda are each provided with an extension 18 and 19 respectively which provide a means for forming the channels 16 and 17 respectively. The extensions 18 and 19 also provide a circumferential trough 23 for maintaining the biasing means 15 in place as shown in FIGS. 2 and 3.

In use, the lariat of the present invention incorporating the honda described above may be thrown in a conventional manner; when a target is "captured," it may readily be released upon the application of sufficient tension on the rope 10. If a stationary target is being used, a successful throw will result in capture of the stationary object and the lariat may subsequently be released by giving a simple "tug" to the rope, thus causing the pivoted halves of the honda to part. When a successful throw is made upon a moving target, such as a calf or steer, the animal instinctively tries to continue running, with the result that the force exerted on the lariat is sufficient to cause the honda to release the rope and "break" the lariat. The lesson thus having been learned by the animal, it will continue to run (and perhaps more vigorously) in a straight line directly away from its pursuer, the roper. The utilization of the present invention for practicing roping on moving targets thus facilitates the reuse of the calves or steers without the animal's acquiring undesirable traits or characteristics and becoming what is termed in professional roping language "sour." It may therefore be seen that the utilization of the lariat of the present invention facilitates the practice and acquisition of expertise in the art of roping at considerable less effort and expense as heretofore was required by prior art and conventional techniques.

I claim:

1. In a lariat formed of a rope looped back upon itself to pass through a honda positioned at the end of the rope, the improvement including a releasing honda comprising: a honda loop constructed of a rigid material; said honda loop formed in two parts resiliently secured to each other by an elastic band to permit opening and closing of said honda loop; said elastic band forming biasing means urging said parts into contact to close said honda loop; said two parts each including an extension for enclosing said rope when said parts are in contact with each other; said biasing means comprising an elastic band encircling said extensions.

2. The combination set forth in claim 1, including a channel formed in each of said extensions to form a passageway to receive the end of said rope for securing the honda thereto.

3. The combination set forth in claim 2, wherein the honda loop constructed of rigid material forms an elongated opening therein.

4. The combination set forth in claim 2, wherein said honda loop is bisected to form the two parts thereof.